(12) United States Patent
Hagale et al.

(10) Patent No.: US 7,418,497 B2
(45) Date of Patent: Aug. 26, 2008

(54) AUTOMATICALLY INFERING AND UPDATING AN AVAILABILITY STATUS OF A USER

(75) Inventors: Anthony Richard Hagale, Austin, TX (US); Jason Ernest Kelley, Austin, TX (US); Ryan Rozich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 10/891,797

(22) Filed: Jul. 15, 2004

(65) Prior Publication Data

US 2006/0015609 A1      Jan. 19, 2006

(51) Int. Cl.
    G06F 15/173    (2006.01)
    G06F 15/16     (2006.01)
    G06F 3/00      (2006.01)
(52) U.S. Cl. .................. 709/224; 709/203; 715/710
(58) Field of Classification Search ............ 709/203, 709/206, 220, 224; 715/710
    See application file for complete search history.

(56) References Cited

U.S. PATENT DOCUMENTS

| | | | |
|---|---|---|---|
| 6,301,609 B1 | 10/2001 | Aravamudan et al. | 709/207 |
| 7,035,865 B2 * | 4/2006 | Doss et al. | 707/102 |
| 2001/0003202 A1 * | 6/2001 | Mache et al. | 713/153 |
| 2003/0046296 A1 | 3/2003 | Doss et al. | 707/102 |
| 2004/0186887 A1 * | 9/2004 | Galli et al. | 709/206 |

FOREIGN PATENT DOCUMENTS

WO    WO 2004/0001558    12/2003

OTHER PUBLICATIONS

Day et al, "Method, System, and Program Product for Dynamic Transmission in a Messaging Seeion," U.S. Appl. No. 10/631,058, filed Jul. 31, 2003.
Day et al, "Method, System, and Program Product for Providing Automated Sender Status in a Messaging Session," U.S. Appl. No. 10/631,059, filed Jul. 31, 2003.
Labus et al. "Authorized Access of Off-Line Messaging," U.S. Appl. No. 10/411,416, filed Apr. 10, 2003.
Swearingen et al, "Method and Apparatus for Management of a Primary Buddy List in an Instant Messaging System," U.S. Appl. No. 10/405, 460, filed Apr. 1, 2003.

* cited by examiner

*Primary Examiner*—Ario Etienne
*Assistant Examiner*—El Hadji M Sall
(74) *Attorney, Agent, or Firm*—Matthew W. Baca; Amy J. Pattillo

(57) ABSTRACT

A system, system, and program for automatically inferring and updating an availability status of a user are provided. At least one current activity of a user is detected, where the current activity includes at least one system level event within a computer environment accessible to the user. A current availability status for a particular communication request is inferred from the current activity of the user in view of multiple availability rules, where the multiple availability rules map current activity to multiple possible availability statuses. In addition, inference of the current availability status is determined based on the identity of the requester of communication with the user, where the multiple availability rules map the requester identity in combination with the current activity to multiple availability rules. Output of the current availability status is controlled, such that the requester of the particular communication request is notified of an availability of the user to respond to the particular communication request.

5 Claims, 4 Drawing Sheets

| | ~502 | ~504 | ~506 | ~508 |
|---|---|---|---|---|
| | ACTIVITY CONDITIONS | REQUESTER ID | AVAILABILITY STATUS | INTERRUPT STATUS |
| 510 | (1) IN A MEETING (2) MAKING A PRESENTATION | ALL | TEXT = PRESENTING; GRAPHIC = RED DOT | BLOCK ALL |
| 512 | (1) IN A MEETING (2) TAKING NOTES IN WORD PROCESSOR | ALL EMPLOYEES | AVAILABLE FOR ON-LINE COMMUNICATION | (1) SOUND OFF (2) FLASH TO ALERT |
| 514 | (1) IN A MEETING (2) TAKING NOTES IN WORD PROCESSOR | FRIENDS 1 FAMILY | TEXT = AWAY GRAPHIC = HAPPY FACE | BLOCK ALL |
| 516 | (1) 5PM-8AM (2) MONEY ENVIRONMENT | ALL EMPLOYEES | PERSONAL TIME | PERSONAL TIME |

*Fig. 5*

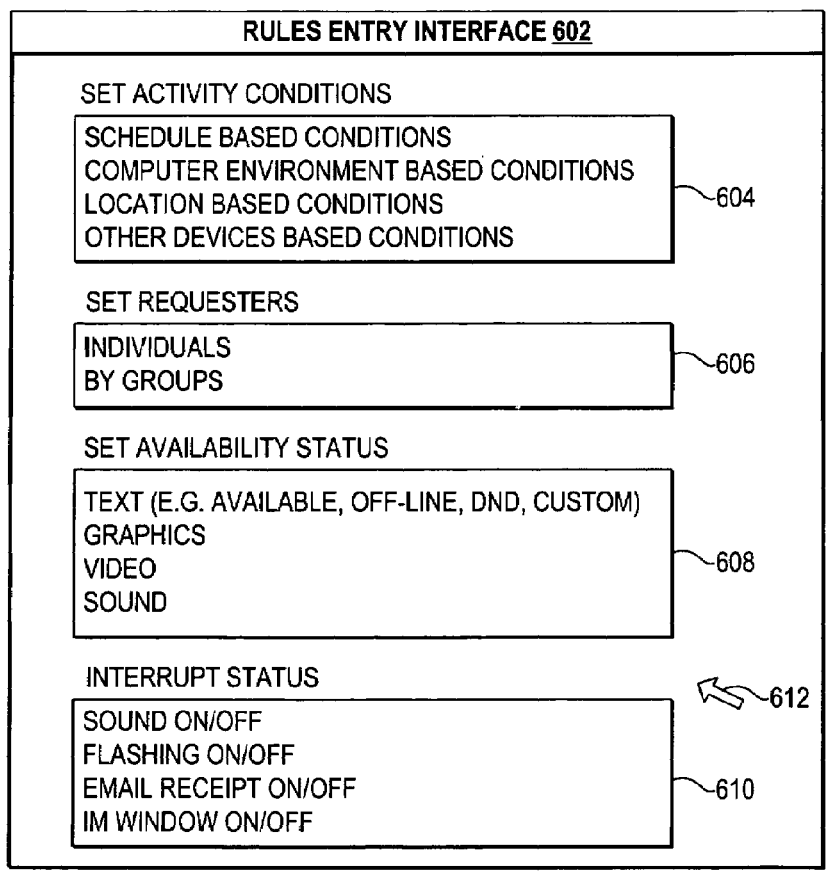

*Fig. 6*

AUTOMATICALLY INFERING AND UPDATING AN AVAILABILITY STATUS OF A USER

BACKGROUND OF THE INVENTION

1. Technical Field

The present invention relates in general to improved communications and in particular to improved notification of an availability of a user to communicate via a particular communication medium. Still more particularly, the present invention relates to automatically inferring an availability status of a user with whom communication is requested based on current system level events indicating a user's activity within a computer environment.

2. Description of the Related Art

The number of mediums of communication continue to increase. Wireless telephones, for example, now enable voice, text, graphic, and picture communications. Computing systems connected to a network may provide communication via electronic mail (email), instant messaging (IM), and chat sessions, for example.

As the number of mediums of communication continue to increase, so too do the number of communication requests that can interrupt a person during the day. For example, a person may be interrupted by a ringing telephone, a flashing instant messaging window, and a beep indicating a new email.

While there may be a number of mediums of communication through which a person can be reached and interrupted, that person may not always be available or may only be available to a particular degree, to communicate via a particular medium. Some mediums of communication, such as an IM controller, allow a user to choose from an availability status, such as available, off-line, or do not disturb, that is broadcast to those seeking to communicate with the user. An IM controller may also detect when a user is off-line and automatically set the user's status to off-line or detect that a user has not interacted with a computer system for a particular period of time and automatically set a user's status to away.

While automatically setting a user's availability status based on whether the user is on-line or off-line or active or away provides some indication of a user's status, merely setting status based on network accessibility or general computer activity is limited. In particular, a user's actual availability to communicate may fluctuate based on what the user is actually doing while on-line, however current IM controllers do not automatically set a user's availability beyond an on-line status or active status.

In addition, a limitation of current communication mediums is that for a user to control communication request interruptions, the user must specifically select whether request interruptions can be received. For example, a user must select to block all IM requests or receive all IM requests. In reality, a user's actual availability to be interrupted with communication requests may fluctuate according to requester and according to what a user is currently actually doing.

In view of the foregoing, it would be advantageous to provide a method, system, and program for automatically inferring an availability status and an interrupt status of a user receiving a communication request. In particular, it would be advantageous to infer an availability status and interrupt status for each particular request for communication with a user based on the identity of the requester of the information and what the user is actually doing. While pre-defined calendaring events may give some indication of what a user might be doing during a particular time, it would be advantageous to determine what a user is actually doing based on current user activity. In particular, it would be advantageous to infer what a user is actually doing based on a user's interactions within a computing environment as indicated by system level events.

SUMMARY OF THE INVENTION

Therefore, the present invention provides for improved communications and in particular for improved notification of an availability of a user to communicate via a particular communication medium. Still more particularly, the present invention provides a method, system, and program for automatically inferring an availability status of a user with whom communication is requested for that particular communication request based on current system level events indicating a user's activity within a computer environment.

At least one current activity of a user is detected, where the current activity includes at least one system level event within a computer environment accessible to the user. A current availability status for a particular communication request is inferred from the current activity of the user in view of multiple availability rules, where the multiple availability rules map current activity to possible availability statuses. Then, a requester of the particular communication request is notified of an availability of the user to respond to the particular communication request based on the current availability status.

In addition, the current interrupt status for a particular communication request is inferred from the current activity of the user in view of multiple availability rules, where the multiple availability rules map current activity to possible interrupt statuses. An interruption to notify the user of the particular communication request is controlled according to the current interrupt status.

In an alternate embodiment, the current activity of the user may also include a schedule event, a physical location of the user, and an event detected from a second computing device. The multiple availability rules may include conditions based on system level events, scheduled events, a physical location of the user, and event detected from a second computing device.

In determining the current availability status and interrupt status for the particular communication, an identifier of a requester of the communication with the user is detected. The multiple availability rules may include conditions based on the identifier of a user individually or as a member of a group.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is an illustrative example depicting entries within a rules database in accordance with the method, system, and program of the present invention;

FIG. 6 is an illustrative example depicting a rules entry interface in accordance with the method, system, and program of the present invention.

DETAILED DESCRIPTION OF THE PREFERRED EMBODIMENT

Figure 1:
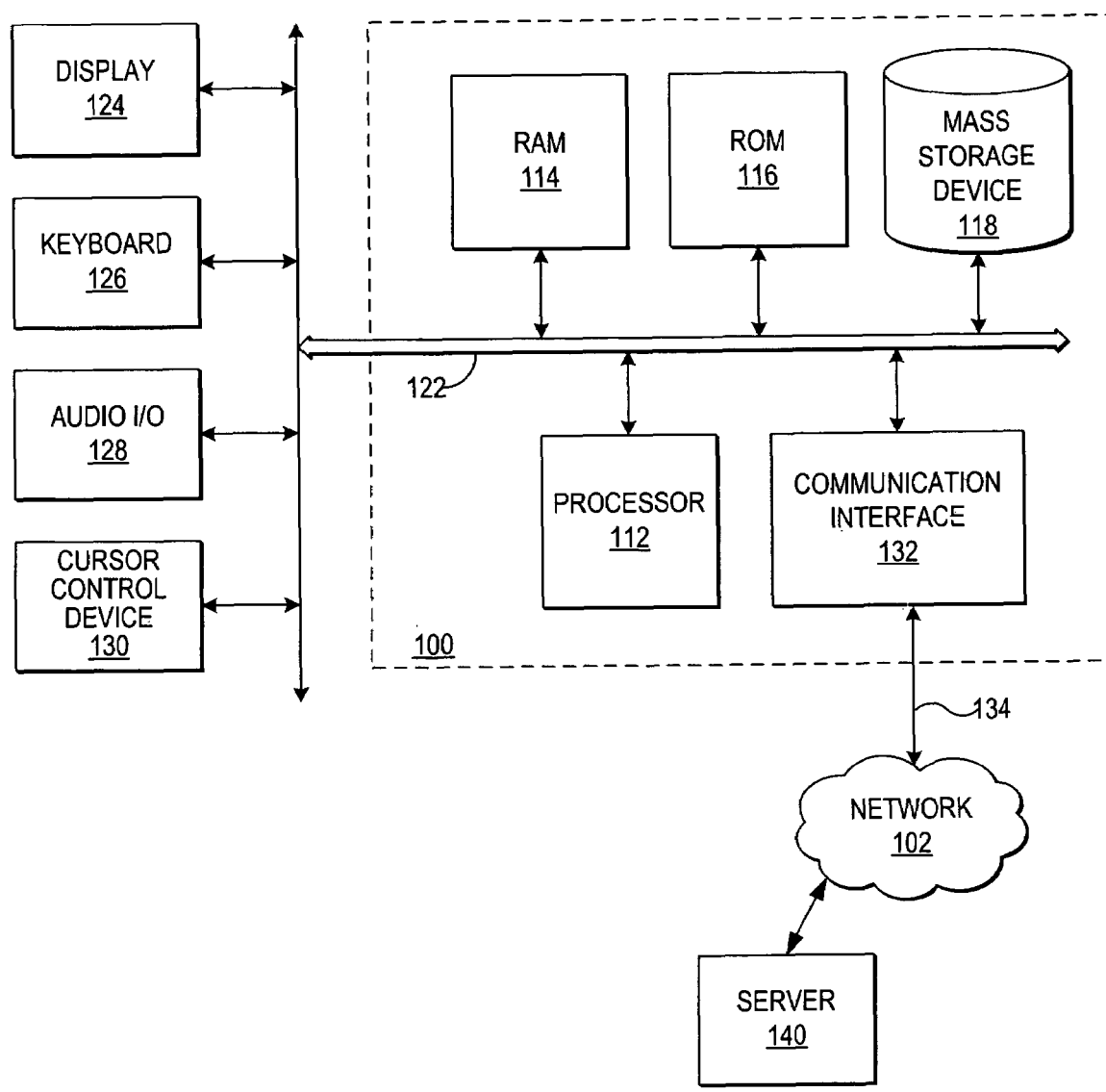
FIG. 1 is a block diagram depicting a computer system in which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems and electronic devices.

Computer system 100 includes a bus 122 or other communication device for communicating information within computer system 100, and at least one processing device such as processor 112, coupled to bus 122 for processing information. Bus 122 may include low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, operating system or application software contains machine executable instructions that when executed on processor 112 carry out the operations depicted in the flowcharts of FIG. 7, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or an Internet Service Provider (ISP). In particular, network link 134 may provide wired and/or wireless network communications to one or more networks.

Network link 134 provides data communication services through network 102. Network 102 may refer to the worldwide collection of networks and gateways that use a particular protocol, such as Transmission Control Protocol (TCP) and Internet Protocol (IP), to communicate with one another. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

In addition, computer system 100 typically includes multiple peripheral components that facilitate communication. These peripheral components are connected to multiple controllers, adapters, and expansion slots coupled to one of the multiple levels of bus 122. For example, an audio input/output (I/O) device 128 is connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
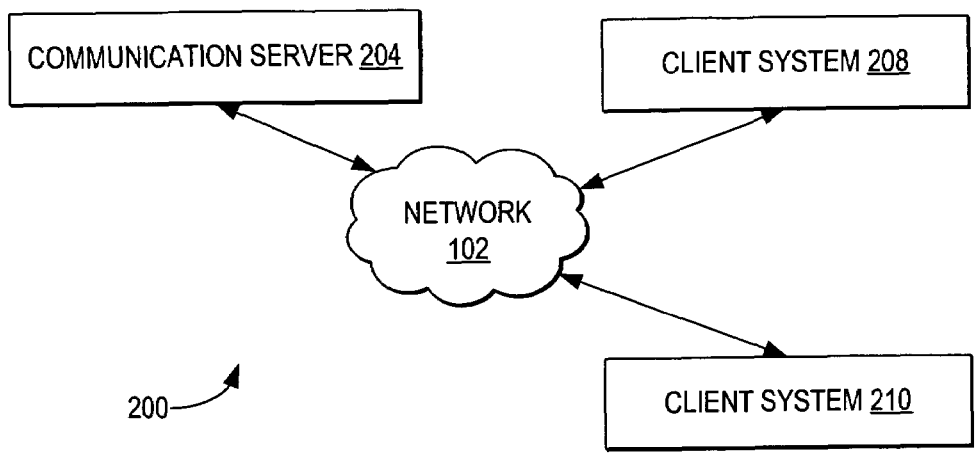
FIG. 2 is a block diagram depicting a communication system for facilitating communication between a user requesting communication and a user receiving a request for communication in one embodiment of the present invention.

With reference now to FIG. 2, a block diagram depicts a communication system for facilitating communication between a user requesting communication and a user receiving a request for communication in one embodiment of the present invention. Communication system 200 is a network of computing devices in which one embodiment of the invention may be implemented. It will be understood that the present invention may be implemented in other embodiments of systems enabled to communicate via a connection.

In the embodiment, communication system 200 contains network 102, which is the medium used to provide communications links between various devices and computers connected together within communication system 200. Network 102 may include permanent connections such as wire or fiber optics cables, temporary connections made through telephone connections and wireless transmission connections.

In addition, in the embodiment, communication system 200 includes client systems 208 and 210, where a communication channel between client system 208 and 210 may be established in a peer-to-peer manner or may be facilitated by a communication server, such as communication server 204. In addition, communication system 200 may include additional client system and communication servers. It is important to note that communications between client system 208 and client system 210 may be implemented through multiple types of communication media including, but not limited to, synchronous communications such as instant messaging, chat sessions, and telephony voice based communications and asynchronous communications such as electronic mail and voice messaging. In addition, other forms of text, graphics, audio and video communications between client system 208 and 210 may be facilitated.

In one embodiment, communication applications residing on client systems 208 and 210 provide an interface for implementing communication services on client system 208 and client system 210. For example, a communication requester at client system 208 may interact with an instant messaging (IM) application to initiate an instant messaging communication channel for requesting an IM based communication with a recipient user. The requester's screen name and a message may be included in the initial IM communication. A communication server 204 facilitates opening the IM communication channel between client system 208 and client system 210. Then, an IM application residing on client system 210 may initiate a window within the display interface that displays the requester's screen name and message.

When implementing a client/server environment, communication system 200 may be implemented within many network architectures. In one example, communication system 200 is implemented through the Internet with network 102 representing a worldwide collection of networks and gateways that use the TCP/IP suite of protocols to communicate with one another. The Internet is enabled by millions of high-speed data communication lines between major nodes or host computers. In another example, communication system 200 is implemented as an intranet, a local area network (LAN), or a wide area network (WAN). Moreover, communication system 200 may be implemented in networks employing alternatives to a traditional client/server environment, such as a grid computing environment. In addition, other types of environments, such as a telephony based environment may be implemented within communication system 200.

According to an advantage of the present invention, when the communication requester at client system 208 requests to communicate with a user at client system 210, a status controller executing in client system 210 or in communication server 204 facilitating the communication may infer an availability status of the user at client system 210 and control distribution of the availability status to client system 208. In addition, client system 210 or communication server 204 may infer an interrupt status of the user at client system 210 and control the any communication request interruption at client system 210 according to the interrupt status. In particular, the availability status and interrupt status may be inferred based on current user activity reported as events, such as system level events occurring at client system 210, within network 102, or at communication server 204. In addition, events such as schedule events, location events, and activity events received from other devices may be detected. Current user activity is filtered through a rules database that specifies availability status and interrupt status based on current user activity and the identity of the requester at client system 208.

It is important to note that while the present invention is described with emphasis upon a single requester requesting communication with a single user, multiple requesters may concurrently request communication with a single or multiple users. For example, it will be understood that a group of users currently engaged in a communication session may request that a particular user or multiple users join the current communication session.

Figure 3:
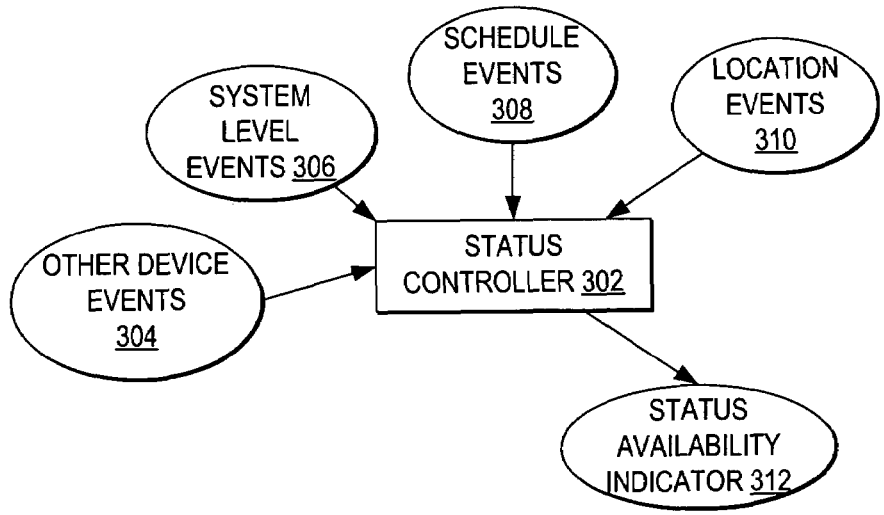
FIG. 3 is a block diagram depicting the activity received by a status controller and used to infer and control a status availability indicator in accordance with the method, system, and program of the present invention.

Referring now to FIG. 3, there is depicted a block diagram of the activity received by a status controller and used to infer and control a status availability indicator in accordance with the method, system, and program of the present invention. As depicted, a status controller 302 receives indications of multiple types of current activity of a user.

In one example, status controller 302 may receive indicators of current activity of a user within a computing environment from system level events 306. System level events 306 may indicate, for example, which software application is currently displayed within a display interface, a mode that a user is operating within, events indicating user interaction with a particular software application, network traffic events indicating a user communicating via the network, or a lack of activity by a user within a computer environment.

In another example, status controller 302 may receive indicators of current activity of a user from schedule events 308. Schedule events 308 may include static pre-scheduled events that indicate a scheduled location or activity of a user, for example. It will be understood that multiple types of scheduling and calendaring applications may be implemented that track a user's scheduled events in a manner that is retrievable by status controller 302.

In addition, in another example, status controller 302 may receive indicators of current activity of a user from a location event 310. Location event 310 may indicate a physical location of a user as detected, for example, by a GPS or other position location system. In one example, an ID scanner may detect that an employee has entered a particular building from a scan of the employee's badge and report the employee's location in the particular building as location event 310 via a network.

Further, in another example, status controller 302 may receive indicators of current activity of a user from other device events 304. Other device events 304 may indicate user activity as detected by other devices. For example, a wireless device may locally broadcast information that is detectable by another computing system in which status controller 302 executes. Other devices may broadcast user activity within a computing environment, scheduled events, physical locations, and other activity monitored by other devices. For example, a wireless telephone device may broadcast a signal indicating that the user is currently on the phone and information about the call as an other device event to status controller 302. In another example, a heartbeat monitor may wirelessly broadcast an indication of the user's heartbeat to indicate whether the user is currently exercising as an other device event to status controller 302.

In one embodiment, status controller 302 infers a communication status of the user based on the current activity and a database of rules defined for inferring communication status. The communication status may include an availability status and an interrupt status. The availability status indicates the user availability to receive a communication to be communicated to the requester. Status controller 302 then controls output of a status availability indicator 302 that indicates the availability status. Status availability indicator 302 may be transmitted via a network to a computing system from which a request to communicate with the user is received. The interrupt status indicates the type of interruption that is allowed to alert the user to the communication request.

Figure 4:
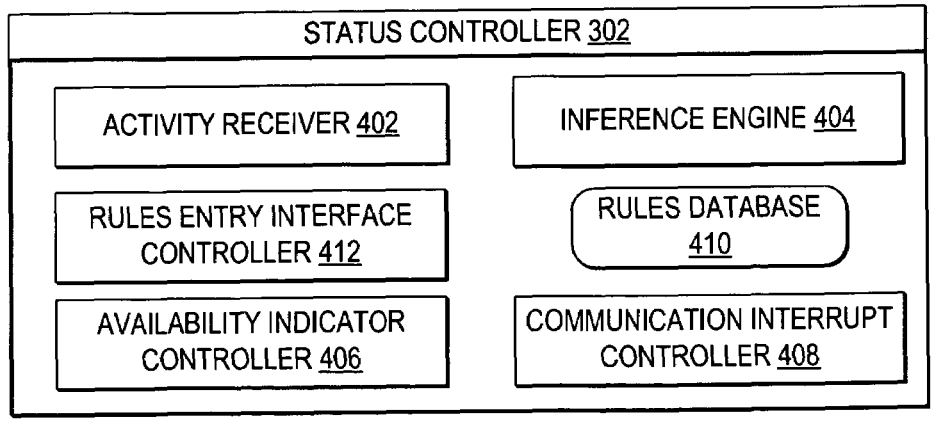
FIG. 4 is a block diagram depicting a status controller in accordance with the method, system, and program of the present invention.

With reference now to FIG. 4, there is depicted a block diagram of a status controller in accordance with the method, system, and program of the present invention. As depicted, status controller 302 includes an activity receiver 302, an inference engine 404, an availability indicator controller 406, a communication interrupt controller 408, a rules database 410, and a rules entry interface controller 412.

Activity receiver 302 may receive current activity events and indicators from multiple sources including, but not limited to, system level events, schedule events, location events, and other device events. Activity receive 302 may request certain types of events from controllers within a computing system or network and may filter events and other indicators to determine only those events and indicators relevant to determining the availability status of a particular user.

Inference engine 404 filters current activity events and indicators to determine a current communication status. The communication status may include an availability status for output to a requester and an interrupt status for controlling the user notification of the communication request. In particular, inference engine 404 accesses a rules database 410 that specifies rules for inferring current communication status. The entries in rules database 410 may be specified by a user via a rules entry interface controller 412. In addition, the entries in rules 410 may be pre-defined rules or rules specified by a network administrator.

Availability indicator controller 406 receives the current communication status determined by inference engine 404 and controls output of the current availability status to a requester. In particular, the availability status may be tailored by availability indicator controller 406 according to the type of computing system or electronic device from which a communication request is received and the type of communication request received. For example, if a requester sends a communication request through an instant messaging communication channel and the availability status is that the user is presenting, then availability indicator controller 406 may enable sending a message back through the instant messaging communication channel that specifies textually that the user is "in a presentation" and a graphically indicates that the user is not available through an "unavailable" graphic.

Communication interrupt controller 408 also receives the current communication status determined by inference engine 404 and controls the interruption to notify the user of the communication request. In one example, communication interrupt controller 408 may enable an instant messaging application, to display a window indicating the screen name of the communication requester.

Referring now to FIG. 5, there is an illustrative example of entries within a rules database in accordance with the method, system, and program of the present invention. As depicted in the example, multiple entries within a rules database are categorized by activity conditions as indicated at reference numeral 502, requester identifier (ID) as indicated at reference numeral 504, an availability status as indicated at reference numeral 506, and an interrupt status as indicated at reference numeral 508. Advantageously, when a rule is created, data may be specified for each of the types of conditions and status.

In a first rule example depicted at reference numeral 510, a first rule includes two activity conditions. In the example, the first activity condition may be based on a schedule event or other type of event that indicates the user is in a meeting. The second activity condition may be based on a system level event that indicates that the user is making a presentation. For example, a system level event indicating that the user is in presentation mode in an application that facilitates presentations, such as Lotus Freelance Graphics (Lotus and Freelance Graphics are register trademarks of International Business Machines Corporation) or PowerPoint (PowerPoint is a registered trademark of Microsoft Corporation), may indicate that the user is making a presentation. In another example, a system level event indicating that there is video going out of the computer system may indicate that the user is making a presentation. The requester identifier designates those requester identifiers to which the rule applies which in the example is all requester identifiers. Next, the rule identifies multiple availability status outputs including a textual output of "presenting" and a graphical output of a red dot. Further, the rule identifies the interrupt status as blocking all communication request interrupts.

In a second example depicted at reference numeral 512, a second rule also includes two activity conditions. In the example, the first activity condition may be based on a schedule event or other type of event that indicates that the user is in a meeting. The second activity condition may be based on a system level event that indicates that the user is taking notes. For example, a system level event indicating that the user is actively interfacing within a word processor, notepad, or other application that typically enables entry of text may indicate that the user is taking notes. In this example, the requester identifier designates that the rule applies to all requesters who are identified as members of a group called "employees". The rule identifies that an availability status is that the user is available for on-line communication. In this case, the status availability indicator may determine not to pass any availability status, but let the user's specific communication represent the availability status. The rule also identifies the interrupt status as blocking all sound based interrupts, but allowing a flash to alert the user to a communication request.

In a third example depicted at reference numeral 514, the same activity conditions are depicted as were specified for the example depicted at reference numeral 512. The requester identifier for the rule designates, however, that the rue applies to all requesters who are identified as users groups called "friends1" and "family". The rule identifies that the availability status is a textual indicator that the user is "away" and a graphical indicator of a "happyface.gif". The interrupt status is to block all communication request interrupts.

In a fourth exampled depicted at reference numeral 516, a rule may designate a particular computing environment condition, such as a "money environment" where the "money environment" can be inferred from system level events within a banking related website, system level events within a money management application, or system level events within a computer system and can be defined as a type of environment for reuse across multiple rules. The rule identifies that when a communication request is received from a requester with an identifier that is part of the employee group, the communication request is received between 5 PM and 8 AM and the user is currently participating in a "money environment" then the availability status and interrupt status are set to "personal time". "Personal time" may be a keyword defined to include a set of availability status indicators and interrupt status indicators, wherein a particular set of status indicators may be specified for reuse within multiple rules.

It is important to note that rules may also be conditioned based on the type of communication medium and the type of communication device through which a requester requests to communicate with a user. For example, multiple rules may be specified based on whether a requester identified as a boss is sending the request from the boss's workstation or from a wireless texting assistant. In addition, it is important to note that the rules may also be conditioned based on the particular type of communication device at which the user would receive the communication request.

With reference now to FIG. 6, there is an illustrative example of a rules entry interface in accordance with the method, system, and program of the present invention. As depicted, a rules entry interface 602 includes multiple condition options for a user setting a rule for rules database 410. In the example, a user may select a condition option by placement of cursor 612 over a condition option field within rules entry interface 602. Alternatively, it will be understood that other user input may be used to select a condition option within rules entry interface 602.

Examples of groups of condition options include activity condition options 604, requester options 606, availability status options 608, and interrupt status options 610. It will be understood that additional activity condition options may be provided dependent on the types of activity indicators that can be detected and interpreted by activity receiver 402.

Examples of activity condition options 604 include enabling the user to select schedule based conditions, computer environment based conditions, location based conditions, and other device based conditions. Computer environment based conditions may include, for example, selections of individual system level events or a computer environment indicated by a system level event or sequences of system level events.

Examples of requester options 606 include enabling the user to select a requester based on an individual identity or a group identity. In particular, a user may specify the identities of individuals within a particular group or the group may be defined within a network environment. In addition, it is important to note that a requester may be identified by multiple types of network communication identifiers including, but not limited to a screen name, a group identifier, a caller identification, a public key, a voice sample, a video image, or other types of identification.

Examples of availability status options 608 include enabling the user to select from textual messages, graphical indicators, video messages, or sound indicators. Textual message may include textual phrases such as available, off-line, away from desk, or a custom message. Video messages may include pre-recorded messages by a user. Graphical indicator and sound indicators may include graphical indicators or sounds that indicate a user availability status. A user may select multiple types of availability status indicators responsive to a particular set of conditions, such that a particular availability status indicator is controlled for output dependent upon the type of interface available at the requester system.

Examples of interrupt status options 610 include enabling the user to select from a sound interruption, a flashing or graphical interruption, an email interruption, or an instant message window interruption. It will be understood that other types of interruption status options may be available dependent upon the types of communication request interruptions that may be performed in a system.

Figure 7:
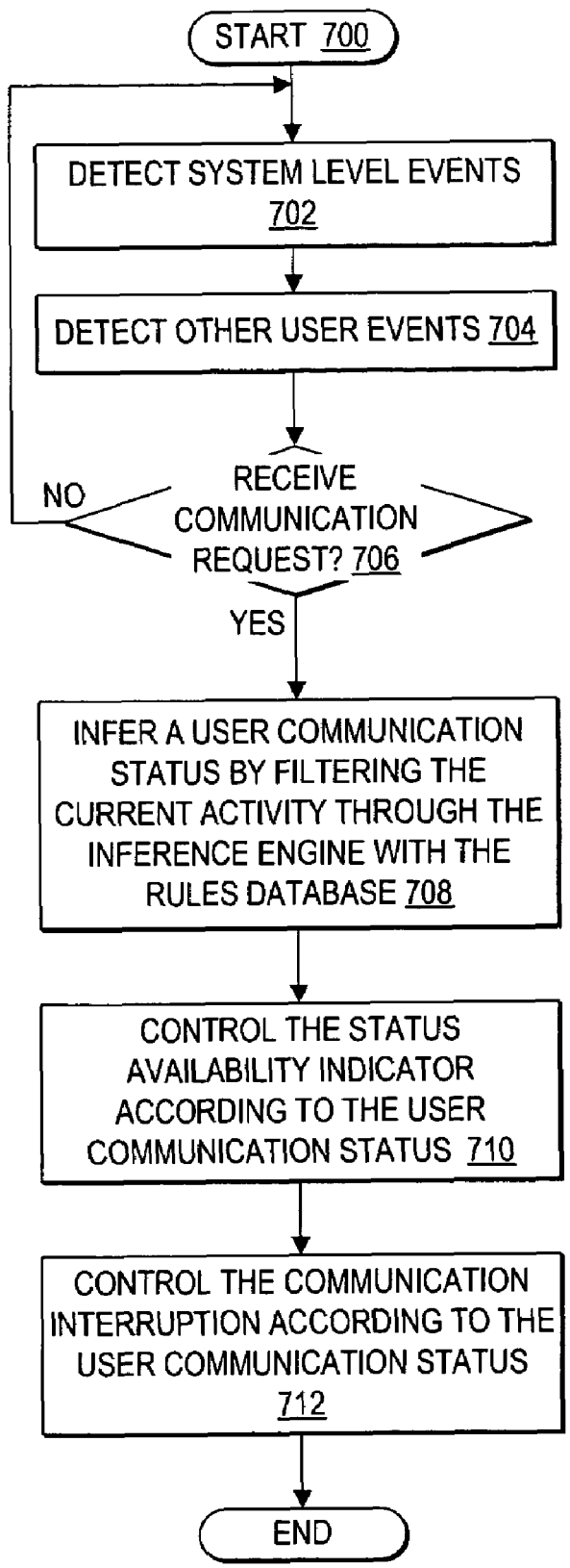
FIG. 7 is a high level logic flowchart depicting a process and program for controlling a status availability interference and output, in accordance with the method, system, and program of the present invention.

Referring now to FIG. 7, there is a high level logic flowchart of a process and program for controlling a status availability interference and output, in accordance with the method, system, and program of the present invention. As depicted, the process starts at block 700 and thereafter proceeds to block 702. Block 702 depicts detecting and filtering system level events that indicate current user activity. Next, block 704 depicts detecting other types of events that indicate current user activity. For example, schedule events, location events, and other device events may be detected as other types of events that indicate current user activity. Thereafter, block 706 depicts a determination whether a communication request to communicate with the user is received. If a communication request is not received, then the process returns to block 702. Otherwise, if a communication request is received, then the process passes to block 708.

Block 708 depicts inferring a user communication status of an availability status and interrupt status by filtering the current activity through the inference engine in comparison with the rules database. Next, block 710 depicts controlling the status availability indicator according to the inferred availability status. Block 712 depicts controlling any communication interruption according to the interrupt status, and the process ends.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for inferring an interrupt status of a user to receive an alert to a communication request at a communication interface, comprising:

responsive to receiving a communication request to communicate with a user, detecting at least one current activity of said user, wherein said at least one current activity comprises at least one system level event indicating user interaction with a particular software application from among a plurality of software applications available within a computer environment accessible to said user;

responsive to receiving said communication request to communicate with said user, detecting an identifier of a requester of communication with said user;

inferring an interrupt status of said user to receive an alert to said communication request from said at least one current activity of said user and said identifier of said requester in view of a plurality of availability rules that map said at least one system level event when combined with said identifier of said requester to a plurality of possible interrupt statuses, wherein said plurality of possible interrupt statuses comprise blocking any alert to said communication request, only allowing a sound for said alert to said communication request, and only allowing a graphic display for said alert to said communication request; and only enabling said alert to notify said user of said communication request in a communication interface for said user as allowed by said interrupt status.

2. The computer-implemented method according to claim 1 for inferring an availability status of a user to receive communications, wherein detecting at least one current activity of said user, wherein said at least one current activity comprises at least one system level event indicating user interaction with a particular software application from among a plurality of software applications available within a computer environment accessible to said user, further comprises:

detecting said at least one system level event indicating a display mode in which said particular software application is currently executing within said computer environment accessible to said user.

3. The computer-implemented method according to claim 1 for inferring an availability status of a user to receive communications, wherein detecting at least one current activity of said user, wherein said at least one current activity comprises at least one system level event indicating user interaction with a particular software application from among a plurality of software applications available within a computer environment accessible to said user, further comprises:

detecting said at least one system level event indicating a user interfacing with a network in a communication enabled by said computer environment accessible to said user.

4. The computer-implemented method according to claim 1 for inferring an availability status of a user, wherein detecting at least one current activity of said user further comprises:

detecting said at least one current activity from at least one from among an electronically scheduled event for said user, a physical location of said user detected from an electronic location detection device, and an event detected from a second computer environment communicatively connected to said computer environment accessible to said user, wherein said event detected from said second computer environment indicates an interaction by said user with said second computer environment.

5. The computer-implemented method according to claim 1 for inferring an availability status of a user, further comprising:

responsive to receiving said communication request to communicate with said user, controlling a broadcast of said interrupt status inferred for said user to a network accessible system from which said communication request is received.

* * * * *